United States Patent
Liu et al.

(10) Patent No.: US 9,805,294 B2
(45) Date of Patent: Oct. 31, 2017

(54) METHOD FOR DENOISING TIME-OF-FLIGHT RANGE IMAGES

(71) Applicant: Mitsubishi Electric Research Laboratories, Inc., Cambridge, MA (US)

(72) Inventors: Ming-Yu Liu, Revere, MA (US); Yuichi Taguchi, Arlington, MA (US); Kilho Son, Providence, RI (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 77 days.

(21) Appl. No.: 14/620,610

(22) Filed: Feb. 12, 2015

(65) Prior Publication Data

US 2016/0239725 A1  Aug. 18, 2016

(51) Int. Cl.
| | |
|---|---|
| G06K 9/66 | (2006.01) |
| G06T 7/521 | (2017.01) |
| G06T 5/00 | (2006.01) |
| G06K 9/46 | (2006.01) |
| G06K 9/52 | (2006.01) |
| G06K 9/62 | (2006.01) |
| G06T 7/60 | (2017.01) |
| G06T 7/13 | (2017.01) |

(52) U.S. Cl.
CPC ............ *G06K 9/66* (2013.01); *G06K 9/4604* (2013.01); *G06K 9/52* (2013.01); *G06K 9/6215* (2013.01); *G06T 5/00* (2013.01); *G06T 5/002* (2013.01); *G06T 7/13* (2017.01); *G06T 7/521* (2017.01); *G06T 7/60* (2013.01); *G06T 2207/10028* (2013.01); *G06T 2207/20004* (2013.01); *G06T 2207/20024* (2013.01); *G06T 2207/20081* (2013.01); *G06T 2207/20084* (2013.01); *G06T 2207/20182* (2013.01); *G06T 2207/20192* (2013.01)

(58) Field of Classification Search
None
See application file for complete search history.

(56) References Cited

U.S. PATENT DOCUMENTS

2014/0093159 A1* 4/2014 Nguyen .................. G06T 5/002
382/154

OTHER PUBLICATIONS

Reynolds, Malcolm, et al. "Capturing time-of-flight data with confidence." Computer Vision and Pattern Recognition (CVPR), 2011 IEEE Conference on. IEEE, 2011.*
Vanĉo, M., and Guido Brunnett. "Geometric preprocessing of noisy point sets: an experimental study." Computing 79.2 (2007): 365-380.*

(Continued)

*Primary Examiner* — Chan Park
*Assistant Examiner* — Geoffrey E Summers
(74) *Attorney, Agent, or Firm* — Gene Vinokur; James McAleenan; Hironori Tsukamoto

(57) ABSTRACT

A method for denoising a range image acquired by a time-of-flight (ToF) camera by first determining locations of edges, and a confidence value of each pixel, and based on the locations of the edges, determining geodesic distances of neighboring pixels. Based on the confidence values, reliabilities of the neighboring pixels are determined and scene dependent noise is reduced using a filter.

17 Claims, 2 Drawing Sheets

(56) References Cited

OTHER PUBLICATIONS

Lindner, Marvin, et al. "Time-of-flight sensor calibration for accurate range sensing." Computer Vision and Image Understanding 114.12 (2010): 1318-1328.*

Senthilkumaran, N., and R. Rajesh. "Edge detection techniques for image segmentation—a survey of soft computing approaches." International journal of recent trends in engineering 1.2 (2009).*

Seitz, Steven M., et al. "A comparison and evaluation of multi-view stereo reconstruction algorithms." 2006 IEEE Computer Society Conference on Computer Vision and Pattern Recognition (CVPR'06). vol. 1. IEEE, 2006.*

Liu, Ming-Yu, Oncel Tuzel, and Yuichi Taguchi. "Joint geodesic upsampling of depth images." Proceedings of the IEEE Conference on Computer Vision and Pattern Recognition. 2013.*

M. Lindner, I. Schiller, A. Kolb, and R. Koch. "Time-of-flight sensor calibration for accurate range sensing." Comput. Vis. Image Underst., pp. 1318-1328, 2010.

M. Reynolds, J. Dobos, L. P. T. Weyrich, and G. J. Brostow. "Capturing time-of-flight data with confidence." In CVPR, 2011.

S. Foix, G. Alenya, and C. Torras. "Lock-in time-of-flight (ToF) cameras: A survey." IEEE Sensors Journal, 2011.

Frank et al. "Denoising of Continious wave time of flight depth images using confidence measures," Optical Engineering, Jul. 1, 2009. http://www.mariofrank.net/paper/frank_filteranalysis_oE09.pdf, retrieved Apr. 26, 2016.

Liu et al. "Joint Geodesic upsampling of depth images." IEEE Computer vision and pattern recognition proceedings, IEEE Computer Society, US. Jun. 23, 2013, pp. 169-176.

Lindner et al. "Time of Flight Sensor Calibration for accurate range sensing," Computer Vision and Image Understanding, Academic Press, US, vol. 114, No. 12. Dec. 1, 2010, pp. 1318-1328.

Terry et al. "Edge detection using neural networks," Signals, Systems and Computers, 1993. Conference Record of the TWenty Seventh Asilomar Conference on Pacific Grove CA. Nov. 1-3, 1993. pp. 391-395.

Reynolds et al. "Capturing Time of Flight data with confidence," Computer Vision and Pattern Recognition, 2011 IEEE Conference on, IEEE. Jun. 20, 2011. pp. 945-952.

Fuchs et al. "Extrinsic and depth calibration of ToF Cameras," Computer Vision and Pattern Recognition, 2008 IEEE Pattern Recognition Jun. 23, 2008. pp. 1-6.

Lefloch et al. Technical Foundation and Calibration Methods for Time of Flight Cameras, Sep. 23, 2013, Correct System Design, Lecture notes in Computer Sciences.

Lenzen et al. "Denoising Strategies for Time of Flight Data," Sep. 11, 2013 Correct system design, Lecture notes in computer science. pp. 25-45.

* cited by examiner

METHOD FOR DENOISING TIME-OF-FLIGHT RANGE IMAGES

FIELD OF THE INVENTION

This invention relates generally to image processing, and more particularly to reducing noise in time-of-flight (ToF) range images.

BACKGROUND OF THE INVENTION

Time-of-flight (ToF) cameras capture scene depth by measuring a phase delay of a modulated signal emitted by an infrared LED flash towards the scene in the space. ToF cameras have become a popular choice for many computer vision applications including human-computer interaction, 3D reconstruction, and object detection. ToF cameras have the advantages of low cost, high speed, and compact form. However, compared to 3D sensors based on laser or structured light, ToF cameras are noisier. Noise in the ToF camera can be classified into two major categories: scene independent noise and scene dependent noise.

The scene independent noise comes from the limitation in manufacturing the ToF camera hardware including the infrared emitter (non-ideal sinusoidal modulation), the sensor (CMOS gate difference for each pixel), and the optics. The limitation results in measurement bias, which depends on the pixel location, the measured range value, and the measured amplitude value.

The scene dependent noise is the result of the multipath behavior of the flash light. It leads to the distortion of:
1) range over-shooting due to the superposition of the reflection lights from neighboring structure; and
2) range smoothing due to the superposition of the reflection signals from foreground and background regions.

Most of the existing methods for reducing the scene independent noise use a global calibration model where the same parametric model is applied to all the pixels in the image. The global calibration model has a small number of parameters and hence requires a small amount of data for fitting. However, the global calibration model fails to model the pixel location dependent bias in the ToF range image, which limits an achievable accuracy.

Simulation using ray tracing has been used for reducing the scene-dependent bias. Several methods exploit multiple modulation frequencies to achieve the same goal. Simulation-based methods require good initial range estimates and are generally slow. Multiple modulation frequencies-based methods require special hardware and are inapplicable to off-the-shelf ToF cameras where only a single modulation frequency is available. A stereo ToF camera can improve the range measurements by modeling occlusions. However, stereo imaging requires two ToF cameras and a baseline.

Several methods aim to enhance or upsample the ToF range images using only the range images or jointly with high-quality color images. Those methods effectively remove random noises but cannot correct measurement biases and retrieve fine structure since those methods do not model the ToF image property.

Deep neural network methods can be used for object recognition tasks, and other image processing tasks, such as image denoising and superresolution. However, those methods are not directly applicable to denoising a ToF range image since the ToF range image has different characteristics than a conventional optical image.

SUMMARY OF THE INVENTION

The embodiments of the invention provide a method for denoising ToF range images. Noise in ToF range images can be scene independent and scene dependent.

To reduce the scene independent noise, we use a planar checkerboard with a carefully-designed intensity pattern as the calibration target and capture the target with the ToF camera from different viewing positions. We use a per-pixel calibration model that relates the ToF range and amplitude measurements with the ground truth range value for each pixel.

To reduce the scene dependent noise, we capture a dataset containing various multi-path distortion patterns using a ToF camera and a high-precision structured light sensor, which produces pairs of ToF and ground truth range images. The dataset is used to train two feedforward neural networks: a first network computes a confidence measure for each pixel in the ToF range image, and a second network computes the edge locations. A filtering algorithm is used to reduce the scene dependent noise where the filter shape is dynamically determined by applying the two networks to the noisy range image.

DETAILED DESCRIPTION OF THE PREFERRED EMBODIMENTS

Figure 1:
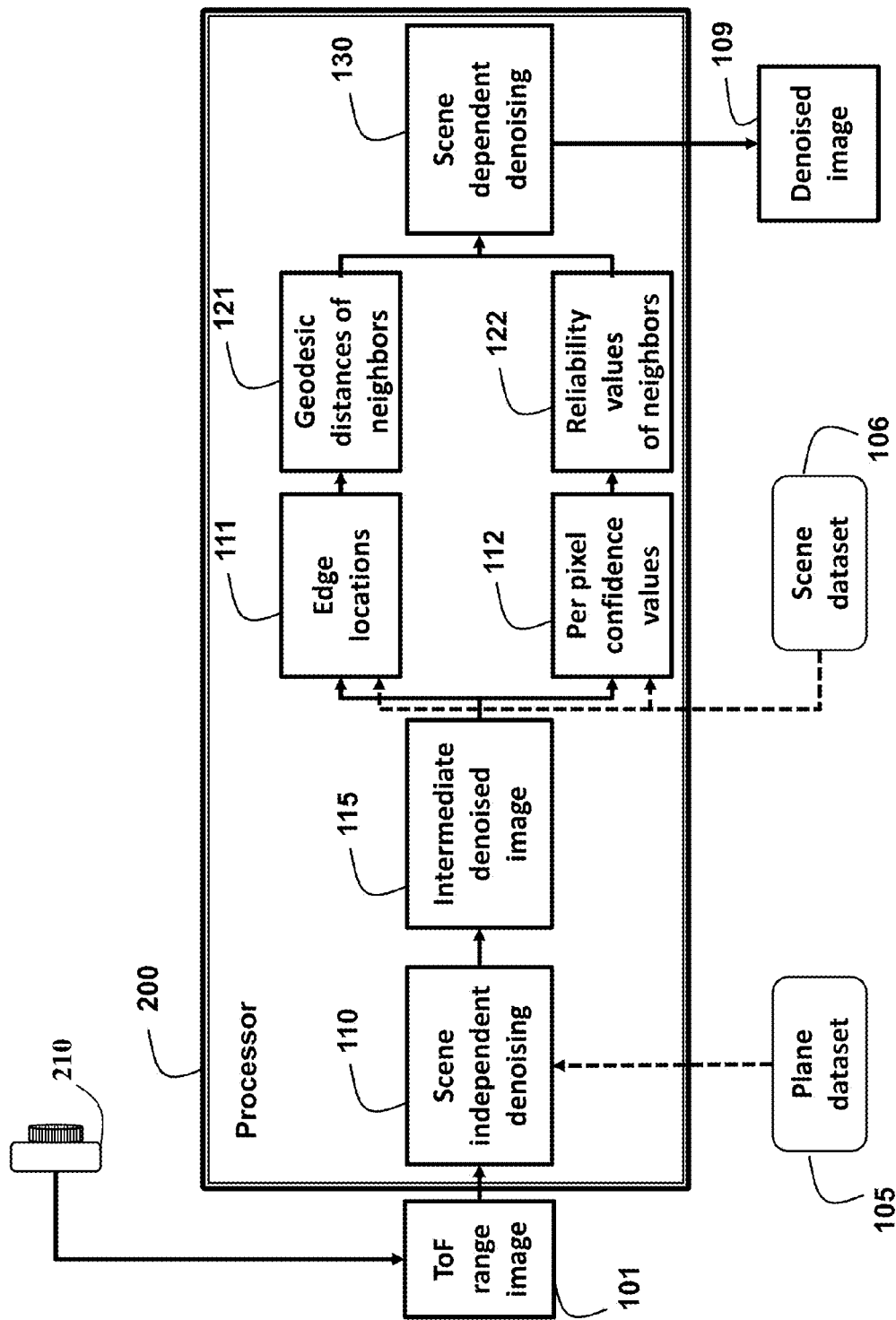
FIG. 1 is a block diagram of a system and method for denoising a time of-flight (ToF) range image according to embodiments of the invention.

As shown in FIG. 1, the embodiments of our invention provide a method for denoising a time-of-flight (ToF) range image 101 to produce a denoised image 109. The method can be can be performed in a processor 200 connected to memory and input/output interfaces by buses as known in the art, see FIG. 2.

Herein, we use range (a distance between a center of the camera and a 3D point in a scene) instead of depth (a Z coordinate of the 3D point in the camera coordinate system), because the range directly corresponds to a phase shift in the signals used by the ToF range camera. The amplitude of the range signal corresponds to a confidence value or reliability of the range measurement.

The method uses a data-driven approach for denoising the ToF range image by reducing scene independent noise based on a plane dataset 105 and scene dependent noise using a scene dataset 106, as described below. The datasets are used during training to learn various models, neural networks, and parameters, all of which can be stored in the memory as described in greater detail below.

To reduce the scene independent noise, we use a pixel-wise calibration model and a novel calibration pattern for generating a wide variety of ranges and amplitudes in the plane dataset. To reduce the scene dependent noise, we determine confidence values and reliable locations of edges, which are then used for denoising the ToF range image using a geodesic filter. The filter is learned using two feedforward neural networks. A first neural network is used for determining the edges, and a second neural network is used for determining the confidence values. The geodesic filter replaces the range of each pixel by a weighted average of ranges from the pixel and neighboring pixels.

As shown in FIG. 1, the ToF range camera 210 acquires the ToF range image 101. Scene independent denoising 110 is applied to the image to produce an intermediate denoised image 115. Then, using the intermediate denoised image, image locations 111 of edges and per pixel confidence values 112 are determined. The locations are used to determine geodesic distances 121 of neighboring pixels, and the confidence values are used to determine the reliability values 122 of neighboring pixels. The geodesic distances and reliability values can then be used for the scene dependent denoising 130 with the geodesic filter to produce the final denoised image 109.

Figure 2:
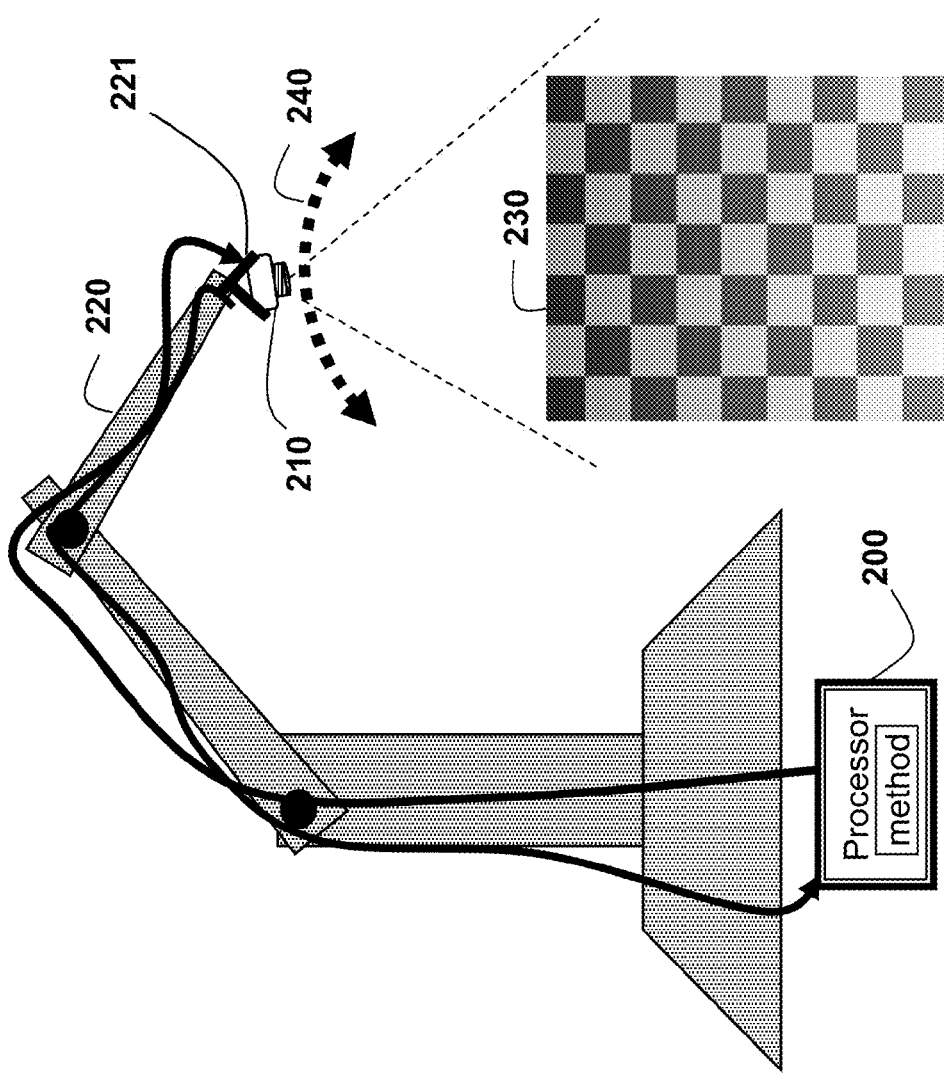
FIG. 2 is a schematic of a system used to acquired ToF images used for training and testing according to embodiments of the invention.

FIG. 2 shows how the plane dataset 105 is acquired for training. The ToF camera 210, e.g., a Soft Kinetic™ DS325, is attached 221 to a robot arm 220. The camera acquires a large set of images of a novel checkerboard calibration pattern 230 from different viewpoints 240. The scene dataset 106 is determined by acquiring images of different scenes (not shown) from different viewpoints using both the ToF camera and structured light sensor attached on the robot arm.

For the scene independent noise, we determine a pixel-wise range calibration model using the plane dataset 105. For reducing the scene dependent noise, we use a geodesic filter based on the geodesic distances and the per pixel confidence values.

One of the main issues of denoising is to determine reliable neighbors to denoise a specific pixel. For this purpose, we use the scene dataset 106 and two feedforward neural networks. A first neural network determines locations 111 of edges. The second neural network determines the confidence values 112 for the pixels. The edge locations are used to select neighboring pixels in terms of the geodesic distance, and the confidence values are used to determine the reliability (weighting factor) of the neighboring pixels.

Dataset Acquisition

Sufficient, unbiased, and accurate training datasets are crucial for data-driven based algorithms. We use the setup shown in FIG. 2 to obtain the two datasets. The plane dataset for scene independent noise modeling and the scene dataset for scene dependent noise modeling.

Plane Dataset

The plane dataset is used to model the scene independent noise. The use of the plane geometry prevents the scene independent noise from intermingling with the scene dependent noise that is caused by multipath interferences due to complex scene geometry. We use the checkerboard pattern 230 of dark and light squares. In our embodiments, the intensities of the checkerboard pattern gradually increase from 0% to 50% for darker squares, and from 50% to 100% for lighter squares. This allows all the corners to have 50% intensity differences in horizontal and vertical directions so that the corner detection can be accurate. In addition, the intensities of the checkerboard pattern vary from 0% to 100%, and are distributed evenly. These characteristics enable us to perform geometric and photometric calibration simultaneously. This pattern has a better corner detection property and wider intensity variety than conventional checkerboard patterns.

We acquire images of the pattern using, e.g., ten different robot poses to estimate intrinsic camera parameters and to perform hand-eye calibration. In robotics, the unknown transformation from the robot coordinate system to the calibration pattern coordinate system and the transformation from the camera (eye) coordinate system to the gripper (hand) coordinate system are estimated simultaneously.

After the hand-eye calibration is performed, the pose of the ToF camera with respect to the checkerboard plane is obtained using the robot poses. Accurate ground truth ranges are obtained by determining intersections between ToF camera "rays" and the plane of the checkerboard. To generate a large and unbiased training dataset, we place the ToF camera orthogonal to the checkerboard plane at, e.g., eleven different distances (from 8 cm to 18 cm) and with 70 random shifts along the plane at each distance.

Scene Dataset

For scene dependent noise modeling, we acquire 900 pairs of ground truth and ToF range images. We randomly arrange sets of different objects, e.g., figurines not shown, to construct various (50) scenes, and acquire 18 different views for each scene, providing 540 training pairs and 360 test pairs.

We use the structured light sensor to acquire accurate ground truths corresponding to the ToF range images. The sensor is configured to achieve less than 0.5 mm accuracy at a working distance of 30 cm to 35 cm. The sensor is precalibrated with respect to the robot so that the coordinate transformation between the sensor and the ToF camera can be obtained using the robot coordinate system.

For the scene dataset, we scan each scene 30 times using the structured light sensor by changing the in-plane rotation angle 10 times at three different distances from the scene. We transform all 30 measurements to the ToF camera coordinate system. For each pixel in the ToF camera, we consider the 3D points projected to the pixel, find the cluster of 3D points closest to the camera center, and use the median of the range values of the 3D points in the cluster as the ground truth range value. If an insufficient number of 3D points are projected to a pixel, then the ground truth range for the pixel is considered unavailable, This happens because the field of views of the ToF camera and the structured light sensor are different and because some regions are occluded even using the multiple viewpoints.

Scene Independent Noise Calibration

We use per-pixel calibration models for the scene independent noise calibration and determine parameters of the models using the plane dataset. We consider an operating range from 8 cm to 18 cm, which is relatively small compared to the full working range of the ToF camera. We use simple functions to relate the range and amplitude measurements with the ground truth range value for each pixel in the operating range. For the full operating range, a piece-wise model can be applied. We consider the following three models:

1) linear: $R_l(p) = \beta_1 r(p) + \beta_2 a(p) + \beta_2 a(p) + \beta_3$;
2) bilinear: $R_b(p) = \beta_1 r(p) a(p) + \beta_2 r(p) + \beta_3 a(p) + \beta_4$; and
3) quadratic: $R_q(p) = \beta_1 r^2(p) + \beta_2 r(p) a(p) + \beta_3 a^2(p) + \beta_4 r(p) + \beta_6$, where r(p) is the range and a(p) is the amplitude at pixel p. We estimate the parameters $\beta_i$ for each pixel using the plane dataset.

Scene Dependent Denoising

To reduce the scene dependent noise, we use the following filter $$\hat{R}(p) = \frac{\sum_{q \in N(p)} w(p,q) R(q)}{\sum_{q \in N(p)} w(p,q)}, \quad (1)$$

where R(p) is the range at pixel p in the intermediate denoised image 115, R̂(p) is the denoised range at p, N(p) is the neighbors of p, and w(p, q) is a weighting function measuring a relation between the pixels p and q. The weighting function is assymmetric and has two exponential (exp) components $$w(p, q) = \exp(\gamma C^2(q)) \exp\left(\frac{-G^2(p, q)}{2\sigma^2}\right), \quad (2)$$

where the first factor measures the "confidence" of q and the second factor measures the "similarity" between the two pixels, and where γ and σ define the shape (bandwidth) of the filer, e.g., 4 and 5.

Our goal is to obtain the "confidence" and "similarity" measures that can be used to reduce the scene dependent noise. For this purpose, we use the scene dataset including pairs of ToF and ground truth range images, and learn the first and second feedforward neural networks to determine the edge locations and the confidence values, respectively. The confidence value C is directly used as the weight in Eq. (2).

The edge locations are used to determine the neighbors of p, N(p) in Eq. (1) as well as the similarity weights w(p,q) in Eq. (2). We use a binary edge map to determine the neighbors of a target pixel and their similarities based on the geodesic distance. Specifically, in the image, the distance between two neighboring pixels is set to a constant when the pixels are not on two sides of an edge, otherwise, the distance is set to ∞. The geodesic distance G is a shortest path between the two pixels. In this way, we ensure that the neighboring pixels used to denoise a target pixel are from the same surface when the edge locations are correctly extracted. We use a fast approximation procedure to determine the K (e.g., 16)) nearest neighbors of the target pixel and the geodesic distances.

Confidence Value

To determine pixel-wise confidence values, we learn a regression function that maps a pixel to a confidence value where the ground truth of the confidence value is based on a difference between the ToF range measurement and the ground truth range at the pixel location. A ground truth confidence value of pixel t(p) is $$T(p) = 1 - \frac{2}{\pi}\arctan\left(\alpha\frac{|\tilde{R}(p) - R(p)|}{\tilde{R}(p)}\right), \quad (3)$$

where R̃(p) is a ground truth range at pixel p, and α (e.g., 20) is a parameter to control the changing rate of T(p) according to the difference between R̃(p) and R(p), and T(p) ranges from 0 to 1.

Due to multipath interferences, the ToF pixel measurement is correlated with the measurements from the surrounding pixels. Therefore, we use the measurement data in a patch centered at the target pixel as the input data. Let p be the target pixel. The input data is a vector $$x(p) = [x_R(p)^T x_A(p)^T b_R(p)^T b_A(p)^T]^T, \quad (4)$$

where T is a transpose operator.

The term $x_R(p)^T$ is a vector representing the range values of the neighboring pixels of p. It is obtained by subtracting the range values of the neighboring pixels by the range value of the target pixel, followed by a normalization mapping the values to the interval of 0 to 1. The second term, $x_A(p)^T$ is obtained by applying a similar operation to the amplitude values. The patch size used in our experiments is 11×11. Hence, the dimensions of $x_R(p)^T$ and $x_A(p)^T$ are 121. The last two terms, $b_R(p)^T$ and $b_A(p)^T$, are binary vectors encoding range and amplitude values of p, respectively. The dimension for each of the binary vectors is 30. They are computed by uniformly quantizing the range and amplitude values into 30 different intervals, respectively. We set the corresponding element of the binary vector to 1 if the range and amplitude values fall in the interval; otherwise 0.

Using the pair (X(p), T(p)) as the training data, we learn a regression function by minimizing a Euclidean loss. We use a two-layer feedforward neural network where the first layer contains 40 neurons and the second layer contains 10 neurons. The neurons are fully connected. We apply rectified linear units (ReLU) after the neurons for modeling the non-linear relationship between the input data and target measure. The neurons in the second layer are fed in to the network output neuron, which is a sigmoid neuron. The network outputs a value ranging from 0 to 1, which is the same as the ground truth confidence value.

Edge Detector

We determine the ground truth edges and their orientation by applying a Canny edge detector on the ground truth range measurements. We partition the edges into 4 groups based on a uniform quantization of the edge directions. For each group, the edges from the other groups as well as non-edge pixels are used as negative training data. We use 4 edge detectors of different edge directions.

We use 4 independent neural networks for the 4 edge detectors. Similar to the case of the confidence value, we extract the measurements surrounding a pixel p within a patch to form an input vector without the binary encoding $$x(p) = [x(p)^T x(p)^T]^T. \quad (5)$$

The structures of the 4 networks are the same as the network of confidence value. However, the directional edge detector networks have two output units, which represent the edge and non-edge likelihood scores. The networks are trained by minimizing a softmax (normalized exponential) loss.

For each pixel, we determine a maximum response from the 4 trained directional edge detectors as the edge likelihood score and direction. Then, we apply nonmaximum suppression and hysteresis thresholding, similar to the Canny edge detector, to determine the final edge map.

EFFECT OF THE INVENTION

The embodiments of the invention reduce scene independent noise and scene dependent noise in ToF range images. A per-pixel calibration model is used to reduce the scene independent noise, and filtering is used to reduce scene dependent noise. The filtering only uses reliable and near neighboring pixels. The filter is learned using feedforward neural networks for edge locations and pixel-wise confidence values.

We claim:

1. A method for denoising an image, wherein the image is a time-of-flight (ToF) range image, wherein the image includes a 2D grid of pixels, comprising steps of:
   determining locations of edges, and a confidence value of each pixel;
   determining, geodesic distances of neighboring pixels, wherein the geodesic distances are determined using a binary edge map, wherein a geodesic distance between two neighboring pixels is set to a constant when the two neighboring pixels are not on different sides of an edge of the binary edge map, otherwise, the geodesic distance is set to ∞ infinity;

determining, based on the confidence values, reliabilities of the neighboring pixels; and reducing scene dependent noise using a filter, wherein the filter uses the geodesic distances and the reliabilities of the neighboring pixels, wherein the ToF range image is acquired by a ToF range camera, and the steps are performed in a processor.

2. The method of claim 1, further comprising:
calibrating the range image, wherein the calibrating further comprises:
reducing scene independent noise using a pixel-wise calibration using a checkboard calibration pattern, wherein intensities of the checkboard calibration pattern gradually increase from 0% to 50% for darker squares, and from 50% to 100% for lighter squares.

3. The method of claim 1, wherein the locations of the edges are determined using a neural network.

4. The method of claim 3, wherein the neural network is learned from a scene dataset including pairs of ToF range images and ground truth range images.

5. The method of claim 4, wherein the ground truth range images are obtained using at least one structured light sensor.

6. The method of claim 5, wherein the ToF range camera and the structured light sensor are attached on a robot arm, the ToF range camera and the structured light sensor are calibrated with a robot coordinate system, and the coordinate transformation between the ToF range camera and the structured light sensor is obtained using the robot coordinate system.

7. The method of claim 1, wherein the confidence values are determined using a neural network.

8. The method of claim 7, wherein the neural network is learned from a scene dataset including pairs of ToF range images and ground truth range images.

9. The method of claim 8, wherein the ground truth range images are acquired by a structured light sensor.

10. The method of claim 9, wherein the structured light sensor and the ToF range camera are attached on a robot arm and moved to different viewpoints to acquire the scene dataset.

11. The method of claim 1, wherein the ToF range camera is attached on a robot arm and moved to different viewpoints to acquire a plane dataset.

12. A method for denoising an image, the image is a time-of-flight (ToF) range image of pixels, such that the ToF range image is acquired by an input interface connected to a processor, wherein the processor stores the ToF range image in a non-transitory computer readable memory, and embodied in the non-transitory computer readable memory is a program executable by the processor for performing the method, comprising:
determining locations of edges, and a confidence value of each pixel;
determining, based on the locations of the edges, geodesic distances of neighboring pixels, wherein the geodesic distances are determined using a binary edge map, such that the binary edge map is generated based on the locations of the edges, wherein a geodesic distance between two neighboring pixels is set to a constant when the two neighboring pixels are not on different sides of an edge of the binary edge map, otherwise, the geodesic distance is set to ∞ infinity;

determining, based on the confidence values, reliabilities of the neighboring pixels;

reducing scene dependent noise using a filter, such that the filter uses the geodesic distances and the reliabilities of the neighboring pixels, and transforms the image to produce a filtered image; and outputting the filtered image via an output interface in communication with the processor, wherein noise in the filtered image is less than noise in the image.

13. A system for denoising an image, wherein the image is a time-of-flight (ToF) range image of pixels, comprising:
a non-transitory computer readable memory that includes the image stored therein;
a ToF range camera;
an output interface; and
a processor connected to the non-transitory computer readable memory, wherein the non-transitory computer readable memory includes embodied thereon a program executable by the processor to:
acquire, by the processor, the stored ToF range image, wherein the ToF range image is generated by the ToF range camera;
determine locations of edges, and a confidence value of each pixel;
determine, geodesic distances of neighboring pixels, wherein the geodesic distances are determined using a binary edge map, such that the binary edge map is generated based on the locations of the edges, such that a geodesic distance between two neighboring pixels is set to a constant when the two neighboring pixels are not on different sides of an edge of the binary edge map, otherwise, the geodesic distance is set to ∞ infinity;
determine, based on the confidence values, reliabilities of the neighboring pixels;
reduce scene dependent noise using a filter, such that the filter uses the geodesic distances and the reliabilities of the neighboring pixels, and transforms the image to produce a filtered image; and
output the filtered image via the output interface in communication with the processor, wherein noise in the filtered image is less than noise in the image.

14. The method of claim 13, wherein the confidence values are determined using a neural network.

15. The method of claim 14, wherein the neural network is learned from a scene dataset including pairs of ToF range images and ground truth range images, such that the ground truth range images are acquired by at least one structured light sensor.

16. The method of claim 15, wherein the ToF range camera and the structured light sensor are attached on a robot arm, the ToF range camera and the structured light sensor are calibrated with a robot coordinate system, and the coordinate transformation between the ToF range camera and the structured light sensor is obtained using the robot coordinate system.

17. A method for denoising an image, wherein the image is a time-of-flight (ToF) range image of pixels, comprising steps of:
determining locations of edges, and a confidence value of each pixel;
determining, based on the locations of the edges, geodesic distances of neighboring pixels;
determining, based on the confidence values, reliabilities of the neighboring pixels; and reducing scene dependent noise using a filter, wherein the filter uses the geodesic distances and the reliabilities of the neighboring pixels, such that the filter is $$\hat{R}(p) = \frac{\sum_{q \in N(p)} w(p,q) R(q)}{\sum_{q \in N(p)} w(p,q)},$$

where R(q) is a range at pixel q in the input range image, $\hat{R}$(p) is the range value at p N(p) is the neighboring pixels of p, and w(p, q) is a weighting function measuring a relation between the pixels p and q, and that the weighting function is asymmetric and has two exponential (exp) components $$w(p, q) = \exp(\gamma C^2(q)) \exp\left(\frac{-G^2(p, q)}{2\sigma^2}\right),$$

where a first factor measures the confidence C of pixel q and a second factor measures a similarity of p and q, $\gamma$ and $\sigma$ represent a shape of the filter, G represnts the geodesic distance, wherein the ToF range image is acquired by a ToF range camera, and the steps are performed in a processor.

* * * * *